(12) United States Patent
Seshan et al.

(10) Patent No.: US 6,374,346 B1
(45) Date of Patent: *Apr. 16, 2002

(54) PROCESSOR WITH CONDITIONAL EXECUTION OF EVERY INSTRUCTION

(75) Inventors: Natarajan Seshan, Houston; Laurence R. Simar, Jr.; Reid E. Tatge, both of Richmond; Alan L. Davis, Sugarland, all of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,326

(22) Filed: Jan. 23, 1998

Related U.S. Application Data

(60) Provisional application No. 60/037,660, filed on Jan. 24, 1997.

(51) Int. Cl.[7] .............................................. G06F 9/302
(52) U.S. Cl. ...................................................... 712/221
(58) Field of Search ........................... 712/1, 221, 223, 712/224

(56) References Cited

U.S. PATENT DOCUMENTS

| | | | |
|---|---|---|---|
| 3,596,074 A | | 7/1971 | Mitrofanoff et al. ......... 708/234 |
| 3,909,789 A | | 9/1975 | Holtey et al. ................ 712/245 |
| 4,354,228 A | * | 10/1982 | Moore et al. ........... 395/800.13 |
| 4,513,393 A | * | 4/1985 | Edlund ............................ 710/5 |
| 4,785,393 A | | 11/1988 | Chu et al. .................... 712/221 |
| 5,072,418 A | * | 12/1991 | Boutaud et al. ......... 364/715.06 |
| 5,241,491 A | | 8/1993 | Carlstedt ...................... 708/231 |
| 5,257,263 A | | 10/1993 | Bazet et al. ................. 714/795 |
| 5,331,664 A | | 7/1994 | Desperben et al. .......... 375/341 |
| 5,331,665 A | | 7/1994 | Busschaert et al. .......... 375/341 |
| 5,365,591 A | * | 11/1994 | Carswell ........................ 380/49 |
| 5,398,198 A | | 3/1995 | Mahant-Shetti et al. ..... 708/232 |
| 5,442,577 A | * | 8/1995 | Cohen .......................... 364/716 |
| 5,450,556 A | | 9/1995 | Slavenburg et al. ......... 712/235 |
| 5,485,411 A | | 1/1996 | Guttag et al. ................ 708/230 |
| 5,507,027 A | * | 4/1996 | Kawamoto ..................... 712/24 |
| 5,726,923 A | | 3/1998 | Okumura et al. ............ 708/207 |
| 5,781,457 A | * | 7/1998 | Cohen et al. ........... 364/716.02 |
| 5,946,483 A | | 8/1999 | Boutaud et al. ............. 712/223 |
| 5,964,825 A | | 10/1999 | Seshan et al. ............... 708/490 |

OTHER PUBLICATIONS

Andrew S. Tanenbaum, "Structured Computer Organization", Prentice–Hall, p. 70, 1976.*

(List continued on next page.)

*Primary Examiner*—David Y. Eng
(74) *Attorney, Agent, or Firm*—Gerald E. Laws; W. James Brady, III; Frederick J. Telecky, Jr.

(57) ABSTRACT

A general purpose microprocessor architecture enabling more efficient computations of a type in which Boolean operations and arithmetic operations conditioned on the results of the Boolean operations are interleaved. The microprocessor is provided with a plurality of general purpose registers ("GPRs" 102)and an arithmetic logic unit ("ALU" 104), capable of performing arithmetic operations and Boolean operations. The ALU has a first input (108) and a second input (110), and an output (112), the first and second inputs receiving values stored in the GPRs. The output stores the results of the arithmetic logic unit operations in the GPRs. At least one of the GPRs is capable of receiving directly from the ALU a result of a Boolean operation. In one embodiment, at least one of the GPRs (PN)capable of receiving directly from the ALU a result of a Boolean operation is configured so as to cause the conditioning of an arithmetic operation of the ALU based on the value stored in the GPR.

23 Claims, 10 Drawing Sheets

OTHER PUBLICATIONS

S. Arya, et al; An Architecture for High Instruction Level Parallelism, Proceedings Of the Twenty–Eighth Hawaii Int'l Conf. On System Sciences, vol. II, pp. 153–162.*

Forney, G. David Jr., The Viterbi Algorithm, Proceedings of the IEEE, vol. 61, No. 3, Mar. 1973, pp. 268–278.

Texas Instruments *TMS390S10 MicroSPARC Reference Guide,* 1992, pp. 1–158.

Gwennap, Linley, Mitsubishi Designs DVD Decoder, Microprocessor Report, vol. 10, No. 16, Dec. 9, 1996, pp. 5–9.

Case, Brian, First Trimedia Chip Boards PCI Bus, Microprocessor Report, vol. 9, No. 15, Nov. 13, 1995, pp. 2–7.

Texas Instruments *TMS470R1x 32–Bit Microcontroller Family User's Guide.*

Gwennap, Linley, Intel, HP Make EPIC Disclosure, Microprocessor Report, vol. 11, No. 14, Oct. 27, 1997, pp. 5–9.

* cited by examiner

FIG. 7A

| Pipeline Phase | Symbol | During this Entire Phase | By the End of This Phase |
|---|---|---|---|
| Program Address Generate | PG | | ▫ Except when a program store is in E1, PFC and PADDR and latched to their next values: either the next 8-word boundary after the current PFC or a branch target address.<br>▫ When a program store is in E1, the PFC remains unchanged and PADDR takes the value from the program store instruction. |
| Program Address Send | PS | ▫ PFC valid on PADDR.<br>▫ If a fetch packet fetch needed, PRS set active. | ▫ If PRS active, PMS latches PADDR. |
| Program Wait | PW | ▫ If the fetch packet indicated by the last PRS is necessary, PDS is asserted. | ▫ If PDS is asserted, PMS latches the last requested fetch packet to be driven during PR. |
| Program Data Receive | PR | ▫ If PDS active during the associated PW, PMS drives requested fetch packet onto PDATA_1. Otherwise the previous fetch packet driven on to PDATA_1 is maintained. | ▫ If it can be determined that the fetch packet requested by an active PDS in PW is needed, CPU latches this fetch packet on PDATA_1. Otherwise, this latch maintains state. |
| Dispatch | DP | | ▫ Parallelism of the fetch packet detected.<br>▫ Instructions in the next requested execute packet in the fetch packet dispatched to the appropriate functional units.<br>▫ Detection of the software breakpoint code in the CREG field detected.<br>▫ Multi-cycle NOP, NOP, SWI, and IDLE decoded because they are not passed to individual functional units.<br>▫ PC of the execute packet in DP latched at the end of the cycle as PCDC. |
| Decode | DC | ▫ PCDC valid. | ▫ Control signals for actions during execute decoded. |

FIG. 7B

| Pipeline Phase | Symbol | During this Phase | By the End of This Phase | CPU has Completed Types |
|---|---|---|---|---|
| Execute 1 | E1 | □ All Types: Registers read. | □ Type ISS: Results written to the register file.<br>□ Type ISS: Status written to the control register file.<br>□ Type LD and ST: Address modifications written to the register file.<br>□ Type LD and ST: DADDR, DBS, and DRNW latched for next phase.<br>□ Type ST: DDATA_0 latched for next phase.<br>□ Type BRANCH: PFC and PADDR latches the target address.<br>□ Type STP: PADDR latches the destination address if no fetch is pending. PWS latched as active for next phase.<br>□ Types LD, ST, STP, IMPY: Intermediate states latched. | □ ISC.<br>□ BR. |
| Execute 2 | E2 | □ Types LD and ST: DBS active and DADDR valid.<br>□ Type LD: DRNW active.<br>□ Type ST: DRNW inactive and DDATA_0 valid. | □ Type IMPY: Results written to the register file.³<br>□ Type IMPY: Status written to the control register file.<br>□ Types LD and ST: DMS latches ADDR.<br>□ Type ST: DMS latches DDATA_0.<br>□ Type STP: PMS latches PDATA_0.<br>□ Type LD: Intermediate states latched. | □ IMPY.<br>□ STD.<br>□ STP. |
| Execute 3 | E3 | | □ Type LD: DMS latches data requested during the last cycle.<br>□ Types LD: Intermediate states latched. | |
| Execute 4 | E4 | □ Type LD: DMS drives on DDATA_1 data requested during associated E2. | □ Type LD: DDATA_1 latched.<br>□ Types LD: Intermediate states latched. | |
| Execute 5 | E5 | | □ Type LD: DDATA_1 right-aligned, either sign-extended or zero-filled, and written to the register file. | □ LD. |

FIG. 9A

Operations on the .L unit.

| 31 29 | 28 27 | 23 22 | 18 17 | 13 12 | 11 | 5 4 3 | 2 1 | 0 |
|---|---|---|---|---|---|---|---|---|
| creg | z | dst | src2 | src1/cst | x | op | s | p |
| 3 | | 5 | 5 | 5 | | 7 | | |

| 5 4 3 |
|---|
| 1 1 0 |

FIG. 9B

Operations on the .M unit.

| 31 29 | 28 27 | 23 22 | 18 17 | 13 12 | 11 | 7 6 5 4 3 | 2 1 | 0 |
|---|---|---|---|---|---|---|---|---|
| creg | z | dst | src2 | src1/cst | x | op | s | p |
| 3 | | 5 | 5 | 5 | | 5 | | |

| 7 6 5 4 3 |
|---|
| 0 0 0 0 0 |

FIG. 9C

Operations on the .D unit.

| 31 29 | 28 27 | 23 22 | 18 17 | 13 12 | 11 | 7 6 5 4 3 | 2 1 | 0 |
|---|---|---|---|---|---|---|---|---|
| creg | z | dst | src2 | src1/cst | x | op | s | p |
| 3 | | 5 | 5 | 5 | | 6 | | |

| 7 6 5 4 3 |
|---|
| 1 0 0 0 0 |

FIG. 9D

Operations on the .S unit.

| 31 29 | 28 27 | 23 22 | 18 17 | 13 12 | 11 | 6 5 4 3 | 2 1 | 0 |
|---|---|---|---|---|---|---|---|---|
| creg | z | dst | src2 | src1/cst | x | op | s | p |
| 3 | | 5 | 5 | 5 | | 6 | | |

| 6 5 4 3 |
|---|
| 1 0 0 0 |

FIG. 9E

Load/store with 15-bit offset (on the .D unit)

| 31 29 | 28 27 | 23 22 | | 8 7 6 | 4 3 | 2 1 | 0 |
|---|---|---|---|---|---|---|---|
| creg | z | dst/src | cst | y | ld/st | s | p |
| 3 | | 5 | 15 | | 3 | | |

| 4 3 |
|---|
| 1 1 |

FIG. 9F Load/store 'baseR'+'offsetR/cst' on the .D unit

| 31 29 | 28 27 | 23 22 | 18 17 | 13 12 | 9 8 | 7 | 6 | 4 3 | 2 1 | 0 |
|---|---|---|---|---|---|---|---|---|---|---|
| creg | z | dst/src | base R | offset R/cst | mode | r | y | ld/st | 0 1 | s | p |
| 3 | | 5 | 5 | 5 | 4 | | | 3 | | |

FIG. 9G ADDK on the .S unit

| 31 29 | 28 27 | 23 22 | 7 6 | 5 4 | 3 2 | 1 | 0 |
|---|---|---|---|---|---|---|---|
| creg | z | dst | cst | 1 0 1 0 | 0 | s | p |
| 3 | | 5 | 16 | | | | |

FIG. 9H Bitfield operations (immediate forms) on the .S unit

| 31 29 | 28 27 | 23 22 | 18 17 | 13 12 | 8 7 | 6 5 4 3 | 2 | 1 | 0 |
|---|---|---|---|---|---|---|---|---|---|
| cst | z | dst | src2 | csta | cstb | op | 0 1 0 | s | p |
| 3 | | 5 | 5 | 5 | 5 | 2 | | | |

FIG. 9K MVK and MVKH on the .S unit

| 31 29 | 28 27 | 23 22 | 7 6 | 5 4 | 3 2 | 1 | 0 |
|---|---|---|---|---|---|---|---|
| creg | z | dst | cst | h 1 0 1 0 | 0 | s | p |
| 3 | | 5 | 16 | | | | |

FIG. 9L Bcond disp on the .S unit

| 31 29 | 28 27 | 7 6 5 4 | 3 2 | 1 | 0 |
|---|---|---|---|---|---|
| creg | z | cst | 0 0 1 0 | 0 | s | p |
| 3 | | 21 | | | |

PROCESSOR WITH CONDITIONAL EXECUTION OF EVERY INSTRUCTION

This application claims benefit of Provisional appln. 60/037,660 filed Jan. 24, 1997.

CROSS REFERENCE TO RELATED APPLICATIONS

This application is related to coassigned application Ser. No. 09/012,813 now U.S. Pat. No. 6,182,203 filed contemporaneously herewith and incorporated herein by reference.

TECHNICAL FIELD OF THE INVENTION

This invention relates to apparatus and techniques for manipulation and generation of Boolean values and for conditioning operations in a microprocessor.

BACKGROUND OF THE INVENTION

Microprocessors, such as general purpose microprocessors, digital signal processors, and the like, typically include an arithmetic logic unit ("ALU") and a set of registers, sometimes referred to as general purpose registers ("GPRs"), where the operands to be operated on by the ALU can be accessed by the ALU, either immediately or one or more cycles later, in an ALU operation, and where the results of ALU operations can be immediately stored in an ALU operation.

In addition to the operations of addition and subtraction, ALUs may also have the capability of performing Boolean operations, such as compare, logical OR, bitwise OR, AND, or the like. The results of such operations, Boolean values, are typically stored in a register separate from the GPRs, for example in a status register. However, the Boolean values thus stored are not as accessible to the ALU as values stored in a GPR and require several instructions to test the resulting Boolean values. In other words, more processor cycles are needed to, for example, to present such Boolean values to the ALU as an input, should it be desired to do so in order to conditionally execute a later instruction, as compared with presenting a GPR value as an input to the ALU, which is typically done in the same clock cycle in which the ALU operation is performed.

An object of the present invention is improve the way in which instruction in a microprocessor are conditionally executed.

SUMMARY OF THE INVENTION

The present invention provides a general purpose microprocessor architecture enabling more efficient computations of a type in which Boolean operations and arithmetic operations conditioned on the results of the Boolean operations are interleaved. The microprocessor is provided with a plurality of general purpose registers ("GPRs")and an arithmetic logic unit ("ALU"), capable of performing arithmetic operations and Boolean operations. The ALU has a first input and a second input, and an output, the first and second inputs receiving values stored in the GPRs. The output stores the results of the arithmetic logic unit operations in the GPRs. At least one of the GPRs is capable of receiving directly from the ALU a result of a Boolean operation.

In one embodiment, at least one of the GPRs capable of receiving directly from the ALU a result of a Boolean operation is configured so as to cause the conditioning of an arithmetic operation of the ALU based on the value stored in the GPR.

A method is also provided, performed in a microprocessor having such an architecture, in which a Boolean operation is performed in the ALU to obtain thereby a Boolean value representing the result of the Boolean operation. The Boolean value is stored in a first general purpose register in the same clock cycle as that in which the Boolean operation is performed. Thereafter, an arithmetic operation is performed in the arithmetic logic unit and the result of the arithmetic operation is stored in a second general purpose register. However, the step of performing/storing is conditioned on the Boolean value stored in the first general purpose register.

These and other features of the invention will be apparent to those skilled in the art from the following detailed description of the invention, taken together with the accompanying drawings.

DESCRIPTION OF THE DRAWINGS AND APPENDICES

FIG. 7A is a chart which illustrates the processing phases of an instruction execution pipeline in the microprocessor of FIG. 5;

FIG. 7B is a chart which illustrates the execution phases of the instruction execution pipeline in the microprocessor of FIG. 1;

FIGS. 9A–9L illustrate the instruction formats for the microprocessor of FIG. 5;

DETAILED DESCRIPTION OF THE INVENTION

Figure 1:
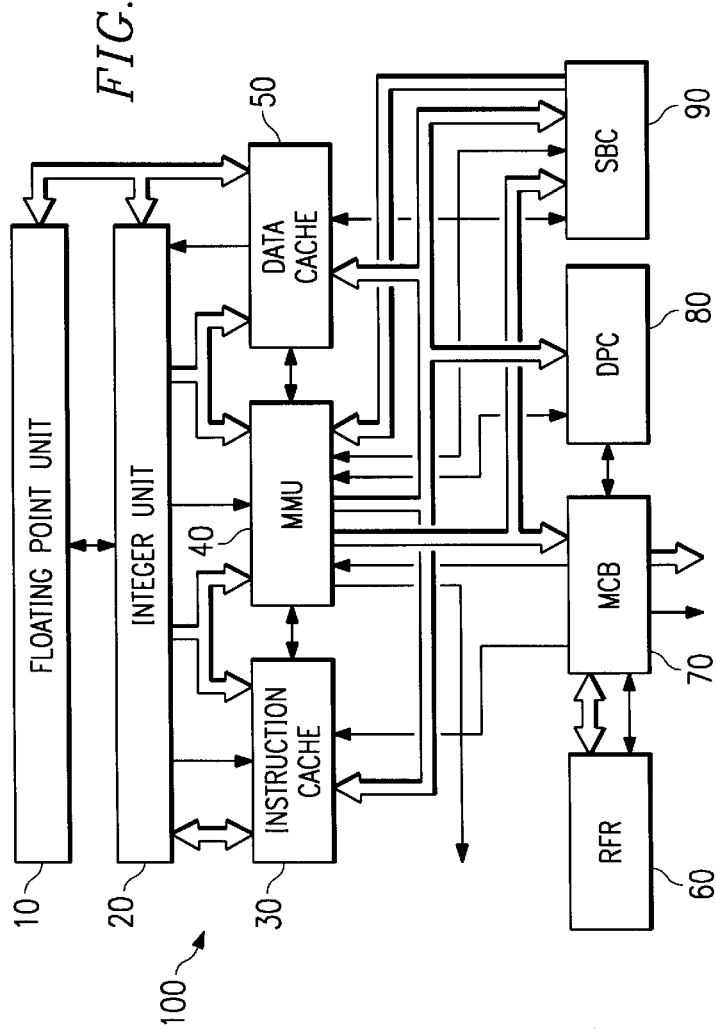
FIG. 1 is a block diagram of a microprocessor.

According to a preferred embodiment of the present invention, a microprocessor architecture is provided including certain advantageous features. FIG. 1 is a high level diagram of an exemplary microprocessor in which the preferred embodiment is presented. For example, the diagram in FIG. 1 may represent a SPARC model TMS390S10 microSPARC. Such microprocessors are well known and detailed description thereof is not presented herein, in the interests of clarity, except with respect to the portion of such microprocessors where modifications may be made in accordance with the preferred embodiment of the present invention.

Note, generally, however, that the microprocessor consists, generally, of a Floating Point Unit 10 for performing floating point computations, an Integer Unit 20 for performing integer computations, Memory 50, which may include, for example, an instruction cache, memory management unit for performing such functions as translating virtual addresses to physical addresses, memory protection and arbitration between input/output and data cache (not shown), RAM Refresh Control 60, Memory Control Block 70, Data Aligner and Parity Check/generate Logic 80, System Bus Controller 90 and various busses and lines 100 interconnecting those blocks. These functional blocks, and their interconnection are well known. Further detail on the microprocessor shown in FIG. 1, for example, can be found in the TMS390S10 microSPARC Reference Guide, obtainable from Texas Instruments Incorporated. It should be understood that architectural details, such as whether the microprocessor has a cache memory or not, are not essential to the invention. The microprocessor architecture outlined in FIG. 1 is exemplary only.

Figure 2:
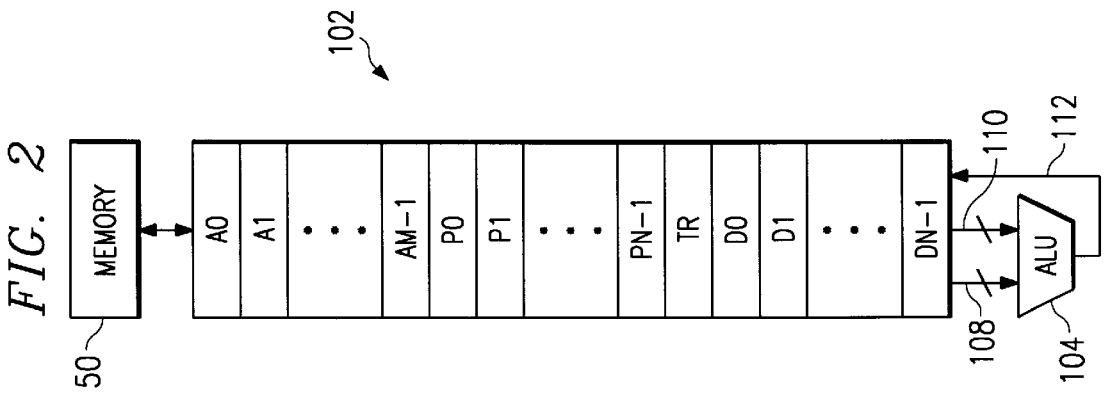
FIG. 2 is a block diagram of a portion of the microprocessor of FIG. 1 showing a register set, ALU and Data.

FIG. 2 is a diagram a portion of a microprocessor such as the microprocessor shown in FIG. 1, however modified in accordance with the preferred embodiment of the present invention. In particular, a portion of the register set found, for example, in the Integer Unit 20 (FIG. 1). Shown are a set of general purpose registers 102, and an arithmetic logic unit 104. The GPRs 102 exchange data with the Memory 50 over a bus 106, while the ALU 104 receives a first input on lines 108 and a second input on lines 110, returning a result value to the GRPs 102 on data bus 112.

The register set 102 includes a subset of registers A0–AM-1, P0–PN-1, TR and D0–DN-1, as shown. Registers A0–AM-1 are multi-bit registers that are directly loadable to/from the ALU 104, and are used to store accumulation results in computations. Registers P0–PN-1 are also multi-bit registers that are directly loadable to/from the ALU 104, but in addition one or more bit values therein may condition a WRITE from the ALU 104 to a register in the register set 102. Registers P0–PN-1 are used to store the results of comparisons in the aforementioned computations. Register TR is a multi-bit register that is directly loadable to/from the ALU 104, and is used to store transition results. Finally, registers D0–DN-1 are multi-bit registers that are directly loadable to/from the ALU 104, and are used to store distance values.

Note that configurations such as that shown in FIG. 2 may exist in which multiple ALUs are provided, each with its own data bus such as data bus 112. In such case, multiple ports would be required for the registers, such as is discussed below in connection with FIG. 3, for such multiple busses. A single ALU 104 is shown in FIG. 2 for the sake of simplicity of explanation of the functions of the various registers therein.

Figure 3:
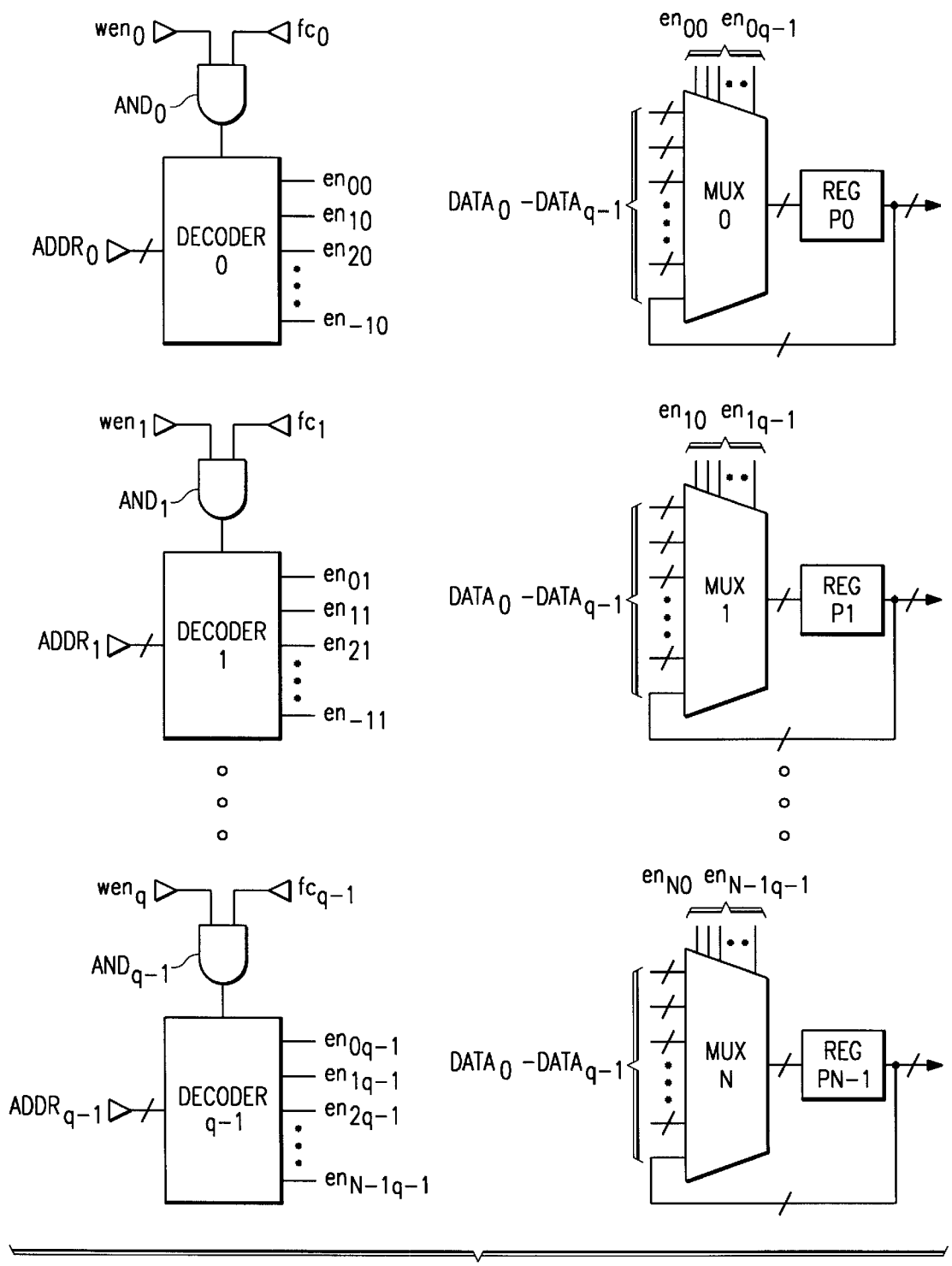
FIG. 3 is a is a detailed circuit diagram of relevant portions of the registers represented in FIG. 2.

FIG. 3 is a detailed diagram of relevant portions of the registers P0–PN, implementing the preferred embodiment of the present invention. The register set consists of N registers receiving data from q input ports, in this case configured as write address decoders. Each such port receives data from a data bus, such as data bus 112 of FIG. 2. Multiple such data busses would exist in a microprocessor having, e.g., multiple ALUs, each with its own data bus for storing data to the registers. For example, the register set might consist of sixteen registers, each storing thirty two bits from one of six write address decoders. Other numbers and combinations are selectable by the designer according to the particular processor architecture the designer is designing to. Only three of the q write address decoders and three of the N registers are shown, in the interest of clarity. The principles of operation of the write address decoders and registers shown in FIG. 3, explained below, apply similarly to the other write address decoders and registers, and they can be constructed once FIG. 3, as explained below, is understood.

The write address decoders of the registers are implemented in the form of q address decoders, labeled DECODER 0 through DECODER q-1, as shown. Each such address decoder receives as an input a respective address ADDR0 through ADDRq-1. The outputs of two-input AND gates AND0 through ANDq-1 are provided to the enable input of the respective address decoders, DECODER 0 through DECODER q-1, as shown. Each such AND gate AND0 through ANDq-1 receives as inputs a write enable signal wen0 through wenq, respectively, and a functional control signal fc0 through fcq-1, respectively.

The outputs of the address decoders DECODER 0 through DECODER q-1 are enable signals expressed in the form of en(reg#)(port#), where the value, reg# is a number identifying the register to which the data being operated on is to be stored (e.g., reg#=0 means the data is to be stored in register REG P0, reg#=1 means the data is to be stored in register REG P1, and so forth), and where the value port# is a number identifying the port through which the data being operated on is being inputted (e.g., port#=0 means the data is being inputted through DECODER 0, port#=1 means the data is being inputted through DECODER 1, and so forth). Thus, the outputs of DECODER 0 are the signals en00 through enN-10, respectively. The outputs of DECODER 1 are the signals en01 through enN-11, respectively, and so forth, such that the outputs of DECODER q-1 are signals en0q-1 through enN-1q-1, respectively, as shown.

These output signals en00 through enN-1q-1 are provided to the select inputs of N multiplexers MUX 0 through MUX N-1 associated with REG P0 through REG PN-1, respectively, as shown, such that MUX 0 receives enable signals en00 through en0q-1, MUX 1 receives enable signals en10 through en1q-1, and so forth. MUX N-1 receives enable signals enN-10 through enN-1q-1, as shown. The data inputs of the multiplexers MUX 0 through MUX N-1 is the data associated with each of the q input ports, namely DATA 0 through DATA q-1, respectively. Note that each of DATA 0 through DATA q-1 is a set of data lines, for example a 32 bit wide data bus. In addition, the data output from the respective register associated with the multiplexer is also provided as an input to the multiplexer, as shown, for operations in which the register value is maintained. The output of each of MUX 0 through MUX N-1 is, likewise, a set of data lines the same number as the input data lines, for example a 32 bit wide data bus, as is the output of each of REG P0 through REG PN-1.

In operation, the addresses ADDR0 through ADDRq-1 at the inputs of the respective input port address decoders DECODER 0 through DECODER q-1, which are register addresses, are decoded and the appropriate enable line en(reg#)(port#), is activated to enable the appropriate multiplexer MUX 0 through MUX N-1 to select the appropriate data DATA 0 through DATA q-1, respectively, for storage in the appropriate register REG P0 through REG PN-1, respectively. Thus, for example, for an operation in which data being inputted from DECODER 1 is intended for storage in register REG P0, the address ADDR1 identifies REG P0 as the target register. Address decoder DECODER 1 decodes address ADDR1 and activates enable line en01, causing multiplexer MUX 0 to select the input DATA 1 for storage into register REG P0.

For the operation just described to occur, the respective address decoder (in the example of the previous paragraph, DECODER 1) must be enabled. The output of the respective AND gate (in the example of the previous paragraph, AND 1) must be active. Thus, for example, for AND gate AND 1 both signals, wen1 and fc1 must be active. The signal wen1 is simply the conventional write enable signal for DECODER 1. The signal fc1, however, is a novel signal used in conjunction of the features of the preferred embodiment of the present invention.

Figure 4:
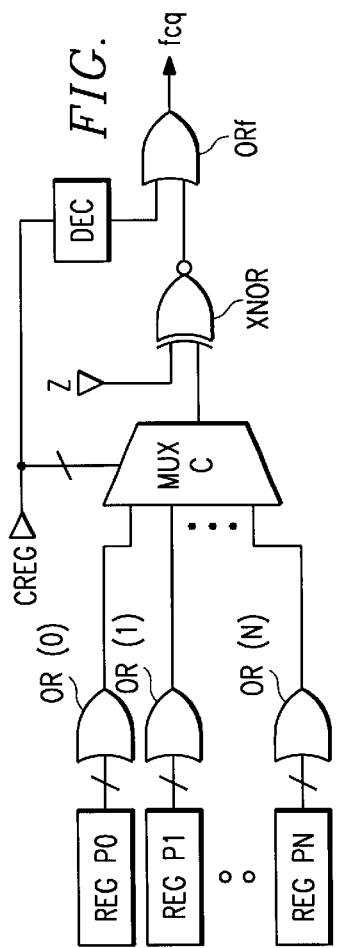
FIG. 4 is detailed circuit diagram showing how certain signals used in the circuit shown in FIG. 3 are generated.

FIG. 4 is a detailed circuit diagram showing how the signals fc0 through fcq-1 are generated. Registers REG P0 through REG PN are shown, with their outputs provided as inputs to OR gates OR 0 through OR N-1, respectively, as shown. Each such OR gate thus provides as an output a signal that is active if any bit value stored in its associated register is a data value of "1". Thus, if any bit in register REG P1 is a data value of "1" the output of OR 1 is a "1", i.e., active. The outputs of OR gates OR 0 through OR N-1 are provided as respective inputs to a multiplexer MUXC. The inputs to MUXC are selected by a set of signals CREG, as will be more fully described below. The selected input is provided to one input of an exclusive OR gate XNOR. The other input of XNOR is a signal z, which will be more fully described below. The output of XNOR is provided to one input of a two-input OR gate ORf, the other input of which is the output of a decoder DEC. Decoder DEC receives as an input the signals CREG, mentioned above. The output of ORf is the signal fcq.

The circuit of FIG. 4 operates as follows. The signals CREG, mentioned above, are signals representing the identity of the register which contains the condition data to condition the present operation, which we may call the "Condition Register". Recall that the preferred embodiment implements a feature by which one or more bit values in a register may condition a WRITE from the ALU 104 to a register in the register set 102 (FIG. 2). In a typical processor implementation these CREG signals are provided from a field in an instruction register, which stores the current instruction. An example of the contents of such a register is:

| 1 | 3 | 13 | 5 | 5 | 5 | <-- number of bits in field |
|---|---|----|---|---|---|---|
| z | CREG | OPCODE | SRC 1 | SRC 2 | DST | <-- register contents (fields) | where:

z selects the "true" condition;

CREG is the address of the Condition Register;

OPCODE is the operation code;

SRC 1 is the source register #1;

SRC 2 is the source register #2; and

DST is the address of the destination register.

OPCODE, SRC 1, SRC 2, and DST are all well known fields, and will not be explained further herein. The bit value "z" selects the "true" condition. Thus, if the condition to be tested is whether the Condition Register contains a "1" in any bit position, then z will be set to a "1". On the other hand, if the condition to be tested is whether the Condition Register contains all "0s", then z will be set to a "0". The value CREG is, as mentioned above, the address of the Condition Register. In this example the value CREG is three bits. This allows for up to eight registers to be configured as Condition Registers. However, it is possible to use three bits for the CREG field and not configure eight registers for use as Condition Registers. For example, only five registers may be so configured. In addition, one value is desirably used to indicate that the current operation is an unconditional operation. An example of a set of CREG values, and their significance is as follows:

| CREG Value | Significance/Condition Register Address |
|---|---|
| 000 | Unconditional operation |
| 001 | REG P0 address |
| 010 | REG P1 address |
| 011 | REG P2 address |
| 100 | REG P3 address |
| 101 | REG P4 address |
| 110 | Reserved |
| 111 | Reserved |

In the above example, the CREG value of "000" is used to indicate that the current operation is an unconditional operation. Five registers, namely, registers REG P0 through REG P4, are configured as Condition Registers. Since only six CREG values are required for the above circumstances, the CREG values of "110" and "111" are reserved for possible later use. The decoder DEC shown in FIG. 4 decodes the CREG value of signals CREG and provides an active output to ORf for the CREG value of "000", i.e., for only unconditional operations in which the operation is not to be blocked. This forces the respective ANDq gate (FIG. 3) to pass the respective wenq enable signal for that operation, regardless of the output of XOR (FIG. 4).

The z signal in FIG. 4 is the value of the z field in the instruction register, and so selects the "true" value conditioning the operation. Thus, when the z signal is active (a "1") XOR outputs a "1" when the output of MUXC is a "1", indicating that a "1" has been found in at least one bit position in the selected Condition Register. Conversely, when the z signal is inactive (a "0") XOR outputs a "1" when the output of MUXC is a "0", indicating that all "0s" have been found in all bit positions in the selected Condition Register. Note that the use of an OR gate in this way represents an implementation that is both simple, economical and effective. It will be appreciated that other implementations could be effected. Thus, only selected bit position from the register might be provided as inputs to the OR gate. Or, other logic could be substituted for the OR gate, at whatever level of complexity desired to implement the desired condition. Likewise, other implementations are readily conceivable, once the principles presented herein are understood, for alternatives to the XOR gate of FIG. 4. Again, more complex logic could be substituted to allow for more complex conditions for the conditional operation.

Thus, it can be seen from the foregoing that the circuits shown in FIGS. 3 and 4 allow the value stored in a register so configured to be used to condition an operation such as a write to a register. It will be appreciated that other operations may be so conditioned as well, such as a read or other memory transaction operations, or an arithmetic operation. An aspect of the present invention is that every instruction of the microprocessor of FIG. 1 can be of a form that is conditionally executable. It is only necessary to, for example, add an AND gate at the appropriate place in the processor circuitry for such other operation, with an fcq signal as one input, to gate an appropriate enable signal for that operation.

Another embodiment of the present invention is now described with respect to FIGS. 5–10.

Figure 5:
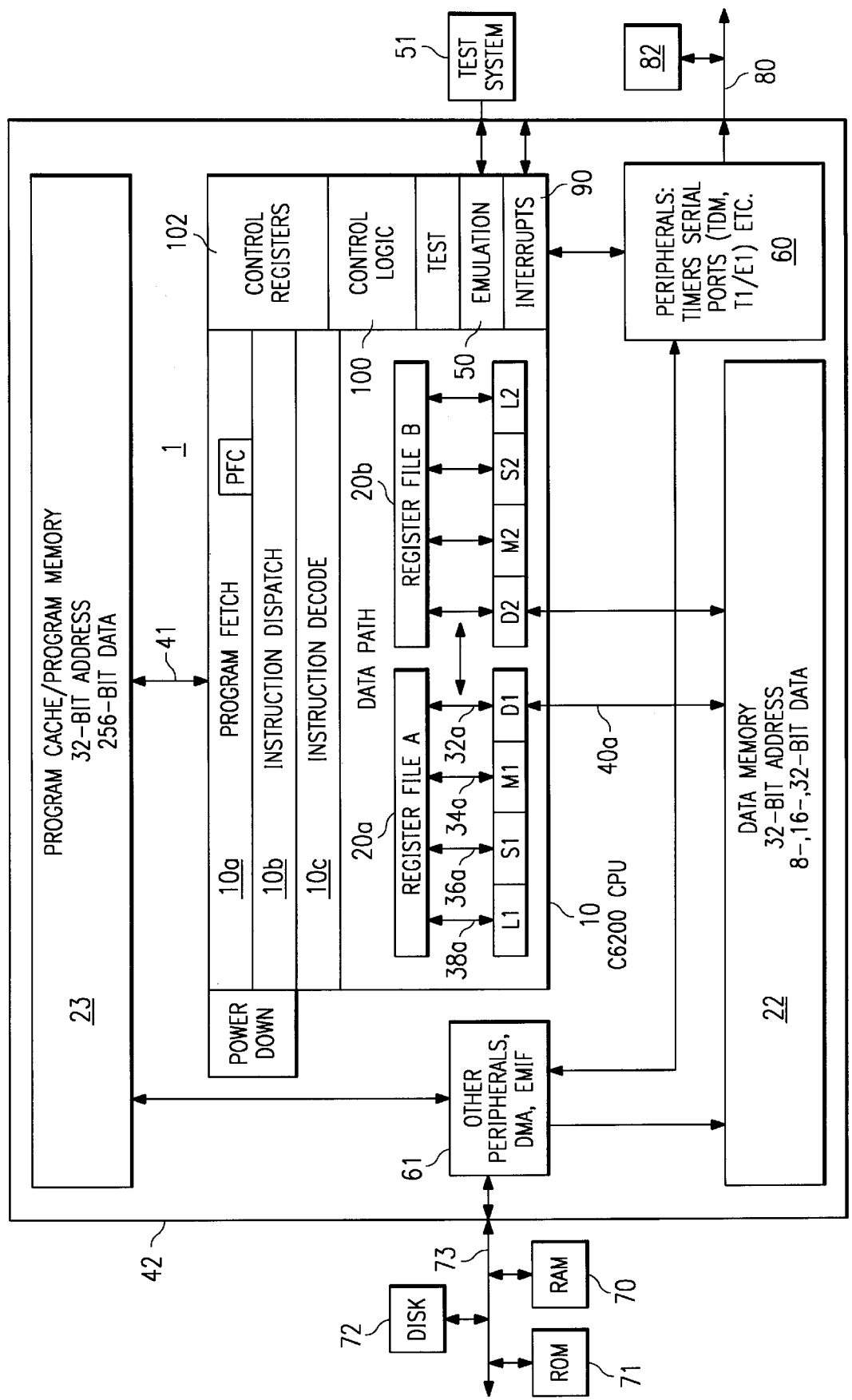
FIG. 5 is a block diagram of a microprocessor which has an embodiment of the present invention.

FIG. 5 is a block diagram of a microprocessor 1 which has an embodiment of the present invention. Microprocessor 1 is a VLIW digital signal processor ("DSP"). In the interest of clarity, FIG. 5 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 5 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 5. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 5 is provided in coassigned application Ser. No. 09/012,813 (TI-26311). A description of a complete set of instructions for the microprocessor of FIG. 5 is also provided in coassigned application Ser. No. 09/012, 813 (TI-25311).

Figure 6:
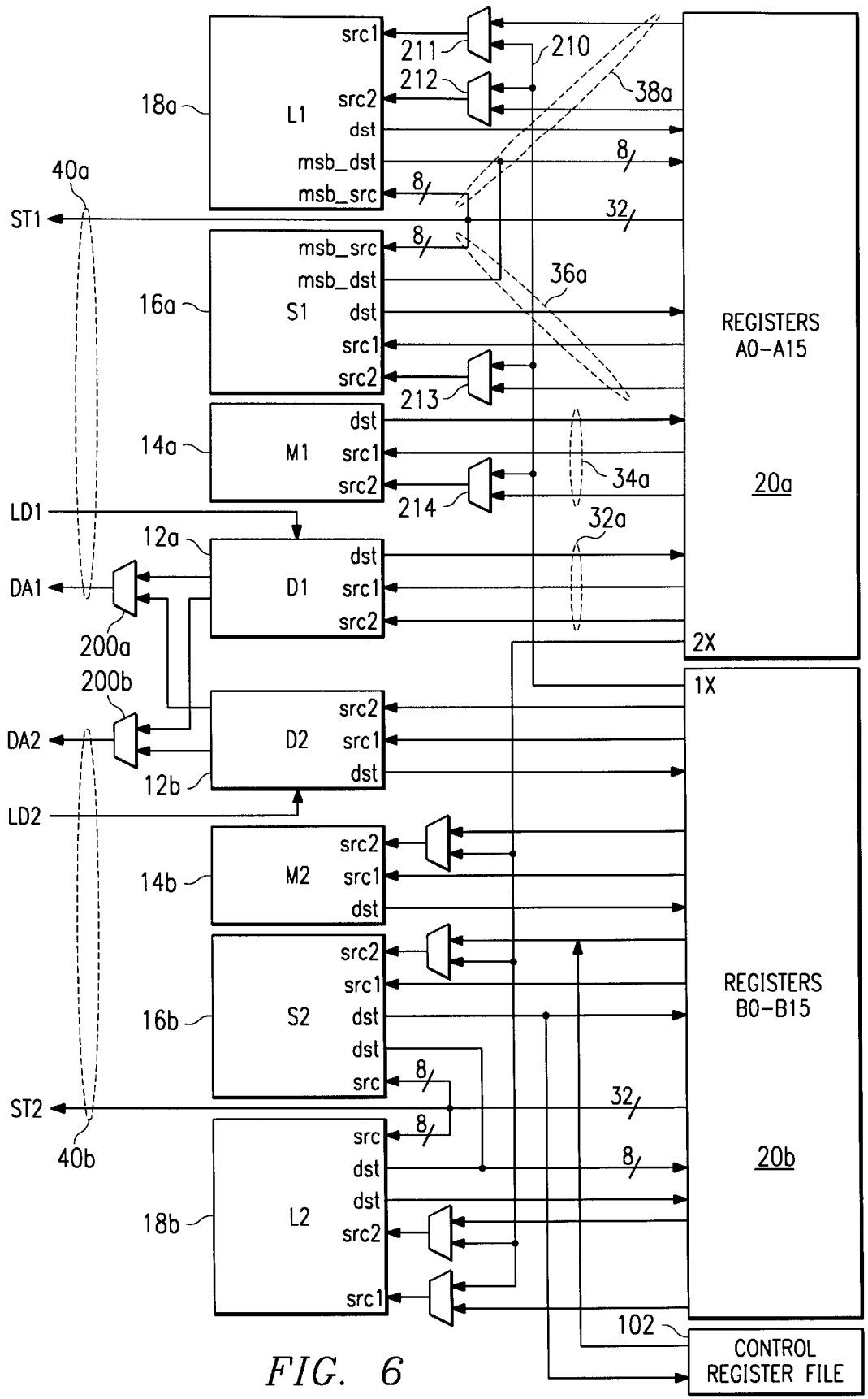
FIG. 6 is a block diagram of the execution units and register files of the microprocessor of FIG. 5.

FIG. 6 is a block diagram of the execution units and register files of the microprocessor of FIG. 5 and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 7A is a chart which illustrates the processing phases of an instruction execution pipeline in the microprocessor of FIG. 5. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 7A, the first phase of processing an instruction is to generate the program address in phase PG. This is done by loading a program fetch counter PFC Which is located in control register file 102. During the second instruction processing phase PS, an address of an instruction fetch packet is sent to program memory 23 via a program address bus PADDR which is part of bus 41. The third phase PW is a wait phase to allow for access time in memory 23. During the fourth phase PR, a program fetch packet is available from program memory 23 via data bus PDATA_I which is part of bus 41. During the fifth processing phase DP, instruction parallelism is detected and instructions that can be executed are dispatched to the appropriate functional units. This aspect of pipeline operation will be described in more detail in later paragraphs. During the sixth processing phase DC, executable instructions are decoded and control signals are generated to control the various data paths and functional units.

FIG. 7B is a chart which illustrates the execution phases of the instruction execution pipeline in the microprocessor of FIG. 1. During the first execution phase E1, single cycle instructions, referred to as "ISC", and branch instructions, referred to as "BR", are completed. A designated execution unit performs the operations indicated in FIG. 7B as directed by control circuitry 100. During the second execution phase E2, the following types of instructions are completed by designated execution units under control of control circuitry 100: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file 20a or 20b.

Figure 8:
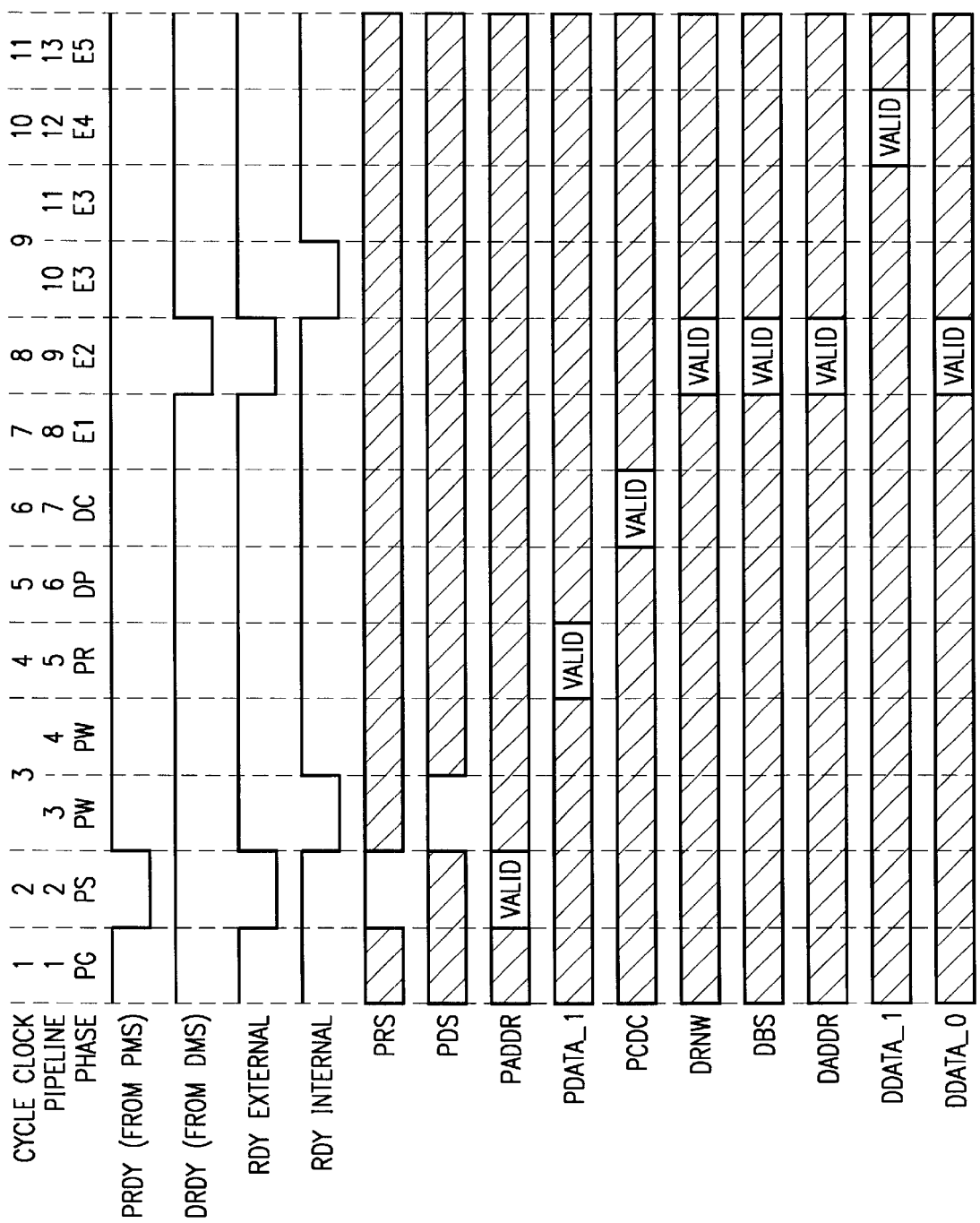
FIG. 8 is a timing diagram which illustrates timing details of processing an instruction fetch packet during the processing phases of FIG. 7A and execution of the execution packet during the execution phases of FIG. 7B.

FIG. 8 is a timing diagram which illustrates timing details of processing an instruction fetch packet during the processing phases of FIG. 7A and execution of the execution packet during the execution phases of FIG. 7B. Note that a pipe stall is illustrated in phase PW due to a program memory ready signal PRDY being low in phase PS, and a second pipe stall in phase E3 due a data memory ready signal DRDY being low in phase E2.

FIGS. 9A–9L illustrate the instruction formats for all of the instructions of the microprocessor of FIG. 5. Field "creg" specifies one of eight registers in register file 20 to use for conditional testing. Field "z" specifies whether to test for zero or not zero. When the specified conditional register matches the specified test the instruction is executed. If the test fails, the instruction is treated as a no-operation.

OPCODE, SRC 1, SRC 2, and DST are all well known fields, and will not be explained further herein. The bit value "z" selects the "true" condition. Thus, if the condition to be tested is whether the Condition Register contains a "1" in any bit position, then z will be set to a "1". On the other hand, if the condition to be tested is whether the Condition Register contains all "0s", then z will be set to a "0". The value CREG is, as mentioned above, the address of the Condition Register. In this example the value CREG is three bits. This allows for up to eight registers to be configured as Condition Registers. However, it is possible to use three bits for the CREG field and not configure eight registers for use as Condition Registers. For example, only five registers may be so configured. In addition, one value is desirably used to indicate that the current operation is an unconditional operation. An example of a set of CREG values, and their significance is as follows:

| CREG Value | Significance/Condition Register Address |
| --- | --- |
| 000 | Unconditional operation if "z" is 0 |
| 000 | reserved if "z" is 1 |
| 001 | REG B0 address |
| 010 | REG B1 address |
| 011 | REG B2 address |
| 100 | REG A1 address |
| 101 | REG A2 address |
| 110 | Reserved |
| 111 | Reserved |

In the above example, the CREG value of "000" is used to indicate that the current operation is an unconditional operation. Five registers, namely, registers REG B0 through REG B3 and A1–2, are configured as Condition Registers. Since only six CREG values are required for the above circumstances, the CREG values of "110" and "111" are reserved for possible later use. Circuitry to implement this function on the embodiment of FIG. 5 is similar to the circuitry described in FIGS. 3 and 4, and therefore does not need to be repeated here.

Figure 10:
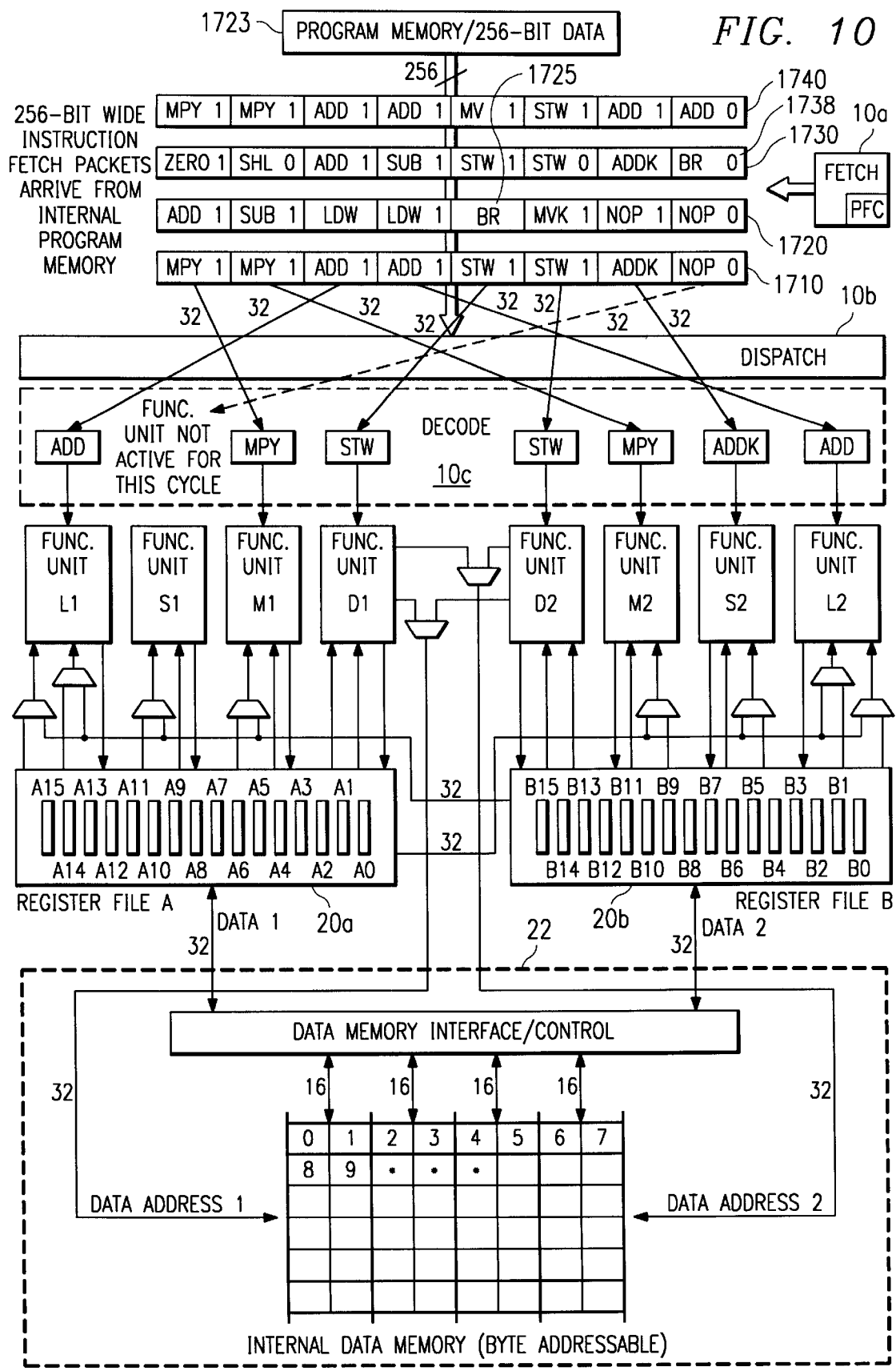
FIG. 10 is another block diagram of the microprocessor of FIG. 5 illustrating parallel operation of conditional instructions.

FIG. 10 illustrates a sequence of instruction fetch packets accessed by the microprocessor of FIG. 5. In FIG. 10, the instruction fetch packet contains eight instructions. Instruction fetch packet 1710 is dispatched and decoded to eight execution units as illustrated. Fetch packet 1720 contains a branch instruction 1725. Instruction fetch packet 1730 contains three instruction execute packets. The first execute packet contains two instructions, ZERO-SHL, which will begin processing in the first delay slot of branch instruction 1725. The second execute packet contains four instruction, ADD-SUB-STW-STW, which will begin processing in the second delay slot of branch instruction 1725. The third execute packet contains two instructions, ADDK-BR, which will begin processing in the third delay slot of branch instruction 1725. According to an aspect of the present invention, branch instruction 1738 will begin processing in the third delay slot of branch instruction 1725 and will be completed five pipeline phases later when the target address of branch instruction 1738 is received by a program fetch counter PFC in fetch unit 10a. All of the instructions have conditional fields and any or all of them may be executed conditionally.

For example:

Conditional instructions are represented by "[ ]" surrounding the condition register. The following execute packet contains two ADD instructions in parallel. The first ADD is conditional on B0 being non-zero. The second ADD is conditional on B0 being zero. "!" indicates the 'not' of the condition.

|    | [B0] | ADD | .L1 | A1,A2,A3 |
|----|------|-----|-----|----------|
| \|\| | [B0] | ADD | .L2 | B1,B2,B3 |

The above instructions are mutually exclusive. This means that only one will execute.

If they are scheduled in parallel, mutually exclusive instructions must still follow all resource constraints.

If mutually exclusive instructions violate resource constraints, they cannot be scheduled in parallel (put in the same execute packet), even though only one will end up executing.

An advantage of the present invention is that a general purpose register is used to store a value which can be used as a predicate for conditional execution of an instruction.

Another advantage of the present invention is that every predicate condition can be specified to be true or false.

Another advantage of the present invention is that every instruction of a microprocessor is conditionally executable based on a predicate value contained in a general purpose register.

An alternative embodiment of the novel aspects of the present invention includes other circuitries which are combined with the circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for executing instructions in a microprocessor, comprising the steps of:
   providing a first instruction field in each and every instruction executed by the microprocessor, wherein the first instruction field contains a condition identifier;
   conditionally executing each and every instruction in the microprocessor, wherein the step of conditionally executing a given instruction comprises the steps of:
      selecting a condition register in response to said condition identifier in said first instruction field of said given instruction; and
      either executing said given instruction if a condition value in said selected condition register has a first condition value, or treating said given instruction as a NOP if said condition value has a second condition value.

2. The method of claim 1, wherein the step of conditionally executing further comprises the step of determining if said condition identifier of said given instruction is a preselected identifier value, wherein said given instruction is unconditionally executed and not treated as a NOP if said condition identifier of said given instruction is said preselected identifier value.

3. The method of claim 2, further comprising the steps of providing in each and every instruction a second instruction field and selecting a value for said first condition value in response to said second instruction field.

4. The method of claim 3, wherein said second instruction field can select a condition value of only true or false.

5. The method of claim 1, wherein the step of selecting a condition register further comprises selecting a first condition register from a plurality of condition registers in response to said condition identifier of said first instruction field.

6. The method of claim 5, wherein the plurality of condition registers are also general purpose registers of said microprocessor, further comprising the step of storing as a condition value the result of an operation performed by an arithmetic unit in the microprocessor.

7. The method of claim 3, wherein said second instruction field can select a condition value of only zero or non-zero.

8. A microprocessor including at least one condition register capable of providing data stored therein to an arithmetic logic unit ("ALU"), comprising:
   means for conditioning execution of each and every instruction executed by said microprocessor by allowing or not allowing an operation associated with each instruction in response to a selected condition value in a condition register selected by each instruction;
   means for indicating a selected condition register of a plurality of condition registers to be associated with each instruction;
   means for indicating a selected condition value that must be in said selected condition register to allow said operation associated with each instruction; and
   means for determining whether said selected condition value is present in said selected condition register.

9. A microprocessor according to claim 8, wherein said means for indicating a selected condition register comprises a portion of an instruction register for storing an instruction field included within each instruction processed by said microprocessor, said instruction field identifying said selected condition register; and
   wherein said portion of an instruction register has signal lines providing signals representing said instruction field to said means for determining.

10. A microprocessor according to claim 9, wherein said means for determining comprises an OR gate receiving as inputs values stored in one or more bit positions of said selected condition register.

11. A microprocessor according to claim 10, wherein said means for conditioning comprises:
   an exclusive OR gate receiving as inputs the result of said means for determining and said selected condition value; and
   an AND gate, the active output of which enables said conditional operation, receiving as a first input an enable signal for said operation and receiving as a second input the output of said exclusive OR gate.

12. The microprocessor according to claim 11, wherein the means for indicating a selected condition value can indicate a condition value of only true or false.

13. The microprocessor according to claim 11, wherein the means for indicating a selected condition value can indicate a condition value of only zero or not zero.

14. A microprocessor having a central processing unit (CPU), the CPU comprising:
   an instruction execution pipeline for executing instructions;
   a condition register connected to receive condition values from the instructin execution pipeline;

condition execution circuitry connected to receive a condition value from the condition register with outputs connected to the instruction execution pipeline; wherein the conditional execution circuitry is operable to cause the individual conditional execution of each and every instruction introduced into the instruction execution pipeline in response to a respective condition value provided by the condition register; and wherein the outputs of the conditional execution circuitry are a plurality of inhibit signals each connected to a respective destination circuit, such that conditional execution of an instruction is performed by either storing a result of an instruction in a selected destination circuit if a respective condition value is true or inhibiting storage of the result if the respective condition value is false.

15. The digital system of claim 14, wherein the instruction execution pipeline further comprises:

a plurality of general purpose registers;

an arithmetic logic unit (ALU) for performing arithmetic operations and Boolean operations, having inputs connected to receive values stored in the general purpose registers, and having an output connected to store the results of the arithmetic logic unit operations in the general purpose registers; and wherein an inhibit signal from the conditional circuitry is operable to inhibit storing of a result of an instruction in the general purpose registers if a respective condition value is false.

16. The microprocessor of claim 15, wherein one of the plurality of destination circuits is a program counter, such that storing a result of a branch instruction in the program counter is inhibited by an output from the conditional execution circuitry if a condition value selected the creg field and the z-field of the branch instruction is false.

17. A microprocessor according to claim 16, the condition register being connected to receive directly from the arithmetic logic unit a Boolean value resulting from an ALU operation.

18. The microprocessor of claim 16, wherein the condition register is also a portion of the plurality of general purpose registers.

19. The microprocessor of claim 14, wherein the condition register is a plurality of condition registers; the instruction execution pipeline further comprising:

an instruction register for storing each instruction processed by the microprocessor, there being a condition register (creg) field included within each instruction processed by the microprocessor, and decode circuitry connected to the instruction register and operable to select one of the plurality of condition registers in response to the creg field.

20. The microprocessor of claim 19, wherein the instruction register further stores a z-field included within each instruction processed by the microprocessor, the conditional execution circuitry being connected to receive the z-field, such that the conditional execution circuitry is operable to condition execution of a respective instruction in response to a true condition value being specified by the z-field.

21. The microprocessor of claim 20, wherein the conditional execution circuitry is operable to allow a first instruction to execute unconditionally in response to a preselected value being in the creg field of the first instruction.

22. The microprocessor of claim 20, wherein the z-field is operable to specify a condition value of only zero or non-zero.

23. A digital system comprising:

a microprocessor having a central processing unit (CPU) according to claim 19;

an instruction memory connected to provide instructions to the CPU;

a data memory connected to the CPU for storing data; and a peripheral device.

* * * * *